(12) United States Patent
Kishimoto et al.

(10) Patent No.: US 11,235,657 B2
(45) Date of Patent: Feb. 1, 2022

(54) CONTROL SYSTEM

(71) Applicant: TOYOTA JIDOSHA KABUSHIKI KAISHA, Aichi-ken (JP)

(72) Inventors: Naoyuki Kishimoto, Susono (JP); Daisuke Tokozakura, Susono (JP); Satoshi Tominaga, Susono (JP); Masaaki Katayama, Susono (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 17/080,838

(22) Filed: Oct. 27, 2020

(65) Prior Publication Data

US 2021/0170858 A1 Jun. 10, 2021

(30) Foreign Application Priority Data

Dec. 5, 2019 (JP) .............................. JP2019-220347

(51) Int. Cl.
*B60K 11/02* (2006.01)
*F01P 3/20* (2006.01)
*F01P 7/16* (2006.01)

(52) U.S. Cl.
CPC ............... *B60K 11/02* (2013.01); *F01P 3/20* (2013.01); *F01P 7/161* (2013.01); *F01P 2050/24* (2013.01)

(58) Field of Classification Search
CPC ... B60K 11/02; F01P 3/20; F01P 7/161; F01P 2050/24
See application file for complete search history.

(56) References Cited

U.S. PATENT DOCUMENTS

| 2012/0102995 A1* | 5/2012 | Sakata | B60L 3/0061 |
| | | | 62/238.1 |
| 2014/0096550 A1* | 4/2014 | Gao | B60L 1/003 |
| | | | 62/115 |

FOREIGN PATENT DOCUMENTS

JP 20158595 A 1/2015

* cited by examiner

*Primary Examiner* — Jacob M Amick
(74) *Attorney, Agent, or Firm* — Hauptman Ham, LLP

(57) ABSTRACT

A cooling system for a powertrain includes: a rotating electrical machine unit including a rotating electrical machine; and a power control unit configured to drive the rotating electrical machine. The cooling system includes: a radiator configured to cool a refrigerant; a refrigerant circulation circuit configured to supply the refrigerant flowing out from the radiator to a second cooled portion via a first cooled portion; a bypass flow path bypassing the second cooled portion; a flow control valve configured to adjust the ratio of a second refrigerant flow rate to a first refrigerant flow rate; and a control device configured to control the flow control valve. The control mode of the flow control valve includes a flow rate limiting mode in which the flow control valve is controlled to adjust the ratio such that the second refrigerant flow rate becomes less than the first refrigerant flow rate.

3 Claims, 5 Drawing Sheets

CONTROL SYSTEM

CROSS-REFERENCE TO RELATED APPLICATION

The present disclosure claims priority under 35 U.S.C. § 119 to Japanese Patent Application No. 2019-220347, filed on Dec. 5, 2019. The content of which is incorporated herein by reference in its entirety.

BACKGROUND

Technical Field

The present disclosure relates to a control system for a powertrain, and more particularly to a cooling system for a powertrain that includes a rotating electrical machine including a rotating electrical machine, and a power control unit configured to drive the rotating electrical machine.

Background Art

JP 2015-008595 A discloses a mechanical and electrical integrated drive unit that is integrally provided with an electric motor for driving a vehicle and an electric power conversion device (inverter) for supplying electric power to this electric motor. In this drive unit, the power conversion device is arranged above a transmission output shaft located rearward in the vehicle front-rear direction with respect to the electric motor so as to be inclined downward and extend rearward in the vehicle front-rear direction.

SUMMARY

In the power train that includes a rotating electrical machine including a rotating electrical machine, and a power control unit configured to drive the rotating electrical machine, it is conceivable to configure a cooling system such that the rotating electrical machine and the power control unit are cooled by the same refrigerant. When adopting this kind of configuration, it is required that the rotating electrical machine and the power control unit can be efficiently cooled while considering the difference in heat resistant temperature between the components of the rotating electrical machine and the components of the power control unit.

The present disclosure has been made in view of the problem described above, and an object of the present disclosure is to provide a cooling system for a powertrain that can efficiently cool a rotating electrical machine and a power control unit.

A cooling system according to the present disclosure is configured to cool a powertrain including: a rotating electrical machine unit including a rotating electrical machine; and a power control unit configured to drive the rotating electrical machine. The cooling system includes a radiator, a refrigerant circulation circuit; a bypass flow path, a flow control valve and a control device. The radiator is configured to cool a refrigerant. The refrigerant circulation circuit is configured to supply the refrigerant flowing out from the radiator to a second cooled portion being a cooled portion of the rotating electrical machine, via a first cooled portion being a cooled portion of the power control unit. The bypass flow path is connected to the refrigerant circulation circuit so as to bypass the second cooled portion. The flow control valve is configured to adjust a ratio of a second refrigerant flow rate being a flow rate of the refrigerant flowing through the second cooled portion to a first refrigerant flow rate being a flow rate of the refrigerant flowing through the first cooled portion. The control device is configured to control the flow control valve. At least one control mode of the flow control valve performed by the control device includes a flow rate limiting mode in which the flow control valve is controlled to adjust the ratio such that the second refrigerant flow rate becomes less than the first refrigerant flow rate.

The rotating electrical machine may include a permanent magnet. The control device may be configured to control the flow control valve to adjust the ratio such that, during the flow rate limiting mode, the temperature of the permanent magnet does not exceed a control upper limit temperature of the permanent magnet that is lower than a heat resistant temperature of the permanent magnet, and the temperature of the permanent magnet approaches the control upper limit temperature of the permanent temperature.

The rotating electrical machine may include a coil. The control device may be configured to control the flow control valve to adjust the ratio such that, during the flow rate limiting mode, a temperature of the coil does not exceed a control upper limit temperature of the coil that is lower than heat resistant temperature of the coil, and the temperature of the coil approaches the control upper limit temperature of the coil.

By the use of the flow rate limiting mode, the cooling system for a powertrain of the present disclosure can reduce a temperature rise of the refrigerant due to excessive (useless) cooling of components of the rotating electrical machine unit whose heat resistant temperature is higher than components of the power control unit. As a result, the temperature of the refrigerant in the refrigerant circulation circuit can be kept low, and therefore, low-temperature refrigerant can be supplied to the power control unit without relying on an increase in the size of the radiator. Thus, according to the cooling system of the present disclosure, it becomes possible to efficiently cool the rotating electrical machine and the power control unit.

DETAILED DESCRIPTION

Figure 1:
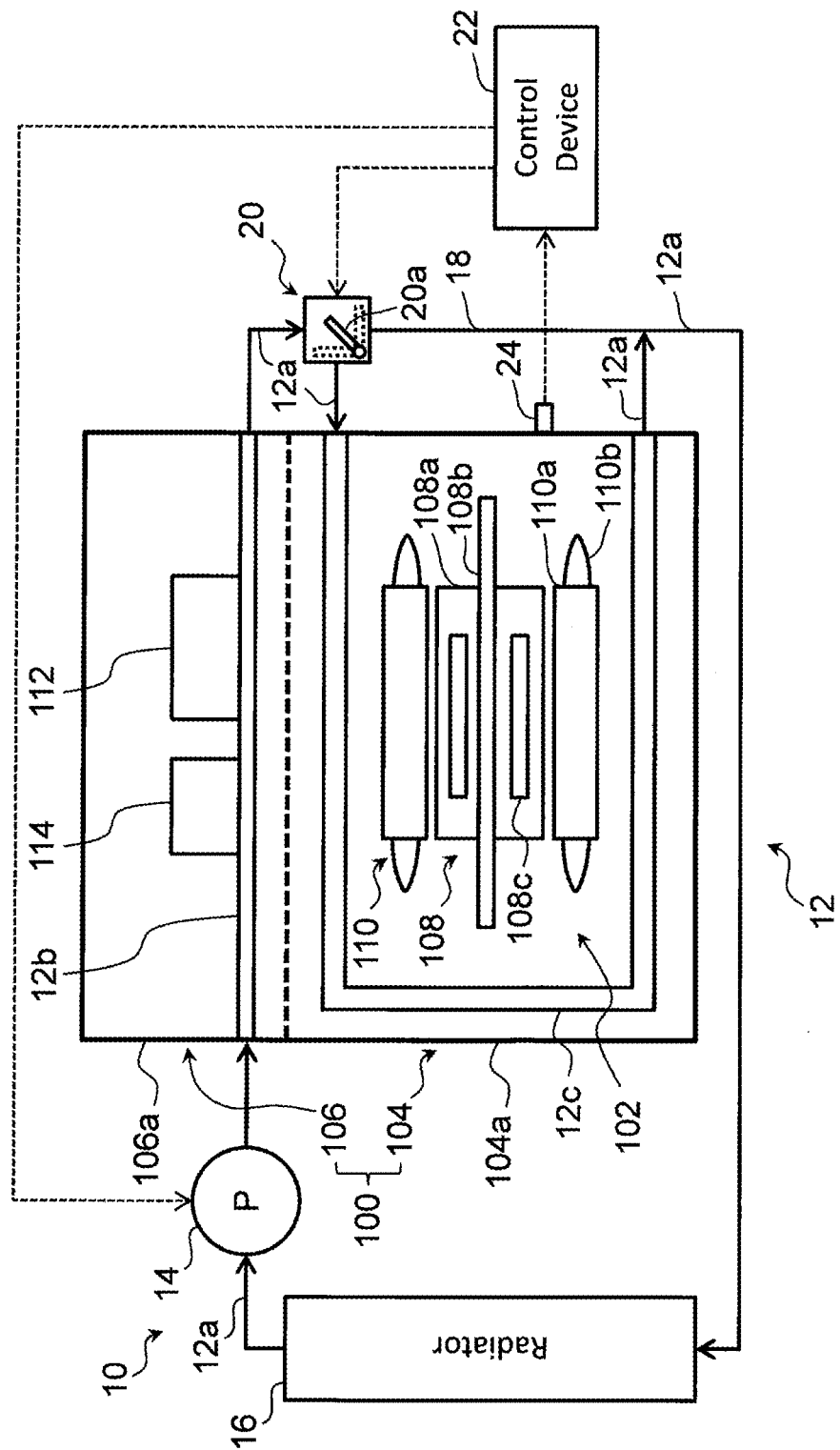
FIG. 1 is a schematic diagram showing an example of a configuration of a cooling system according to a first embodiment of the present disclosure and a powertrain to which the cooling system is applied.

In the following, embodiments of the present disclosure will be described with reference to the accompanying drawings. The same components in the drawings are denoted by the same reference numerals, and redundant descriptions thereof are omitted or simplified. Moreover, it is to be understood that even when the number, quantity, amount, range or other numerical attribute of an element is mentioned in the following description of the embodiments, the present disclosure is not limited to the mentioned numerical attribute unless explicitly described otherwise, or unless the present disclosure is explicitly specified by the numerical attribute theoretically. Furthermore, structures that are described in conjunction with the following embodiments are not necessarily essential to the present disclosure unless explicitly shown otherwise, or unless the present disclosure is explicitly specified by the structures or the like theoretically.

1. FIRST EMBODIMENT 1-1. Example of Configuration of Powertrain and Cooling System FIG. 1 is a schematic diagram showing an example of the configuration of a cooling system 10 according to a first embodiment and a powertrain 100 to which the cooling system 10 is applied. The cooling system 10 shown in FIG. 1 is mounted on the powertrain 100. The powertrain 100 is provided with a transaxle (T/A) 104 including a motor generator (MG) 102 for driving an electrified vehicle, and a power control unit (PCU) 106 for driving the MG 102.

The electrified vehicle is, for example, a hybrid vehicle including an internal combustion engine (not shown) together with the MG 102 as its power sources, but may be replaced with, for example, a battery electric vehicle not provided with an internal combustion engine. The MG 102 and the T/A 104 correspond to examples of the "rotating electrical machine" and the "rotating electrical machine unit" according to the present disclosure, respectively. The rotating electrical machine refers to an electrical machine having at least one function of an electric motor and a generator, and the MG 102 has both functions of the electric motor and the generator.

A specific example of the MG 102 is not particularly limited, but is a three-phase AC synchronous type motor generator. The MG 102 includes a rotor 108 and a stator 110. The rotor 108 includes a rotor core 108a, a rotating shaft 108b penetrating the rotor core 108a, and a permanent magnet 108c embedded in the rotor core 108a. The rotor core 108a and the rotating shaft 108b are made of iron, for example. The stator 110 includes a stator core 110a arranged to cover the rotor 108 and a stator coil 110b. The stator core 110a is made of iron, for example. The stator coil 110b is formed by using an enamel wire (i.e., an electric wire in which a copper wire is coated with an enamel film). An electric current for rotationally driving the MG 102 (rotor 108) is supplied to the stator coil 110b from the PCU 106. It should be noted that the stator coil 110b corresponds to an example of the "coil" according to the present disclosure. Furthermore, in another configuration example of the "rotating electrical machine" according to the present disclosure, the coil is disposed on the rotor side, the permanent magnet may be disposed on the stator side.

The T/A 104 includes a transaxle case (T/A case) 104a that houses the MG 102. The T/A case 104a is made of, for example, a metal such as aluminum. As an example, the T/A case 104a houses not only the MG 102 but also gears (not shown) that transmit the torque outputted from the MG 102 to wheels of the vehicles. Instead of this kind of example, the "rotating electrical machine unit" according to the present disclosure may be provided with a rotating electrical machine such as the MG 102 without providing gears.

The PCU 106 is a power conversion device that is electrically connected between the MG 102 and a battery (not shown). The PCU 106 includes a power control unit case (PCU case) 106a. The PCU case 106a is made of metal such as aluminum. Components of the PCU 106 are housed in the PCU case 106a. The components include, for example, a power semiconductor module 112 for power conversion, and a capacitor 114. The power semiconductor module 112 includes a substrate and power semiconductor elements attached to the substrate. The capacitor 114 smoothes the voltage supplied from the battery described above. The material of these components includes resin.

The Powertrain 100 has a mechanical and electrical integrated structure in which the PCU 106 and the T/A 104 are directly fastened by fasteners such as bolts. Instead of this kind of example, the PCU 106 may be mounted on, for example, the T/A 104 via brackets (not shown). In addition, the PCU 106 may be arranged in contact with or away from the T/A 104 at, for example, a position other than the upper part of the T/A 104.

The cooling system 10 mounted on the powertrain 100 described above is provided with a refrigerant circulation circuit 12, a pump 14, a radiator 16, a bypass flow path 18, a flow control valve 20 and a control device 22.

Specifically, the inside of the refrigerant circulation circuit 12 and the bypass flow path 18 is filled with the refrigerant. The refrigerant is a coolant (cooling water) as an example. The pump 14 is disposed in the refrigerant circulation circuit 12 to circulate the refrigerant. The pump 14 is, for example, an electrically driven type. The position of the pump 14 is not particularly limited. The radiator 16 is disposed in the refrigerant circulation circuit 12 to cool the refrigerant. It should be noted that, instead of the coolant, oil, for example, may be used as the refrigerant flowing through the refrigerant circulation circuit 12 and the bypass flow path 18.

As shown in FIG. 1, the refrigerant circulation circuit 12 is configured to supply the refrigerant flowing out from the radiator 16 to a "second cooled portion" being the cooled portion of the MG 102, via a "first cooled portion" being the cooled portion of the PCU 106. An example of the first cooled portion in the cooling system 10 is the power semiconductor module 112 and the capacitor 114 that are described above. On the other hand, an example of the second cooled portion is the rotor 108 including the permanent magnet 108c, and the stator 110 including the stator coil 110b.

The refrigerant circulation circuit 12 is configured by a refrigerant pipe 12a disposed outside the T/A 104 and PCU 106, and an internal pipe 12b and an internal flow path 12c that are connected with the refrigerant pipe 12a. The internal pipe 12b is arranged inside the PCU case 106a, and a portion of which is in contact with the power semiconductor module 112 and the capacitor 114 that correspond to the first cooled portion. Because of this, the power semiconductor module 112 and the capacitor 114 are cooled by the refrigerant that flows through the internal pipe 12b. The internal flow path 12c is formed in the T/A case 104a itself and covers the periphery of the MG 102 (more specifically, the stator 110). A portion of the internal flow path 12c facing the MG 102 functions as a water jacket. That is to say, the MG 102 is cooled by the refrigerant that flows through the internal flow path 12c (i.e., the refrigerant flowing around the second cooled portion). It should be noted that, instead of this kind of example, the refrigerant circulation circuit may be configured such that refrigerant flow paths are formed in a rotor core and a stator core each corresponding to the second cooled portion, and such that the refrigerant flows through the refrigerant flow paths (i.e., the inside of the second cooled portion).

The bypass flow path 18 is connected to the refrigerant circulation circuit 12 so as to bypass the rotor 108 and the stator 110 each corresponding to the second cooled portion. The bypass flow path 18 is configured such that the refrigerant that has passed through the first cooled portion (i.e., the power semiconductor module 112 and the capacitor 114) returns to the radiator 16 without passing through (the periphery of) the second cooled portion. In the example shown in FIG. 1, the bypass flow path 18 is disposed outside the T/A 104.

The flow rate of the refrigerant flowing through the first cooled portion of the PCU 106 side is referred to as "a first refrigerant flow rate Qp or simply a refrigerant flow rate Qp". Also, the flow rate of the refrigerant flowing through the second cooled portion on the MG 102 side is referred to as "a second refrigerant flow rate Qm or simply a refrigerant flow rate Qm". The flow control valve 20 is configured to control a ratio R of the second refrigerant flow rate Qm to the first refrigerant flow rate Qp. In detail, the flow control valve 20 is arranged at the upstream end of the bypass flow path 18 as an example. The flow control valve 20 includes, for example, a valve element 20a which is driven by an electric motor (not shown) such as a step motor.

The opening degree of the valve element 20a is continuously or stepwise changed between a fully closed state and a fully open state. In this fully closed state, the valve element 20a closes the inlet of the internal flow path 12c, and the ratio R is therefore 0%. On the other hand, in the fully open state, the valve element 20a closes the inlet of the bypass flow path 18, and the ratio R is therefore 100%. Because of this, according to the flow control valve 20, the ratio R can be changed continuously or stepwise within the range of 0% or more and 100% or less. It should be noted that the location and structure of the flow control valve are not limited to the above described example as long as the ratio R can be changed within a desired control range (e.g., the range of 0% or more to 100% or less), and any other known flow control valves can be used.

The control device 22 is an electronic control unit (ECU) including a processor and a memory, and is configured to control the pump 14 and the flow control valve 20. A temperature sensor 24 configured to detect the temperature of the T/A case 104a is attached to the T/A case 104a. The signal of the temperature sensor 24 is inputted to the control device 22.

The control device 22 estimates a temperature T1 of the permanent magnet 108c and a temperature T2 of the stator coil 110b on the basis of a temperature information acquired from the temperature sensor 24. In detail, the estimation of the magnet temperature T1 can be performed as follows, for example. That is, a relationship between the detected value of the temperature sensor 24 and the magnet temperature T1 is obtained based on the results of an experiment or the like performed in advance. Then, the magnet temperature T1 corresponding to the detected value of the temperature sensor 24 is obtained from this kind of relationship. This also applies to the estimation of the coil temperature T2. Moreover, an electric current sensor (not shown) configured to detect an electric current flowing through the stator coil 110b may also be included, and the coil temperature T2 may be estimated by using an electric current information from the electric current sensor together with the temperature information from the temperature sensor 24. Furthermore, each of the temperatures T1 and T2 may be actually measured using a dedicated temperature sensor.

1-2. Control of Flow Control Valve

According to the cooling system 10 having the configuration described above, the cooling of the PCU 106 and the MG 102 is performed using the same (common) refrigerant. Each of the power semiconductor module 112 and the capacitor 114, which are components of the PCU 106 and each correspond to the first cooled portion, is configured to include a resin material. On the other hand, the rotor 108 and the stator 110, which are components of the MG 102 and each correspond to the second cooled portion, are made of metal materials including the permanent magnet 108c and the stator coil 110b. Because of this, the heat resistant temperatures of the components of the PCU 106 are lower than those of the components of the MG 102. It should be noted that the heat resistant temperature of a member or component referred to in the present specification corresponds to a temperature at which a defect (for example, a decrease in magnetic force, a deformation, a distortion or a crack) starts to occur in the member or component when the temperature of the member or component exceeds the heat resistant temperature.

Accordingly, when cooling the PCU 106 and the MG 102 using the same refrigerant, it is necessary to lower the temperature of the refrigerant flowing into the PCU 106 in order not to exceed the heat resistance temperature of the components of the PCU 106 that is lower than that of the components of the MG 102. In this regard, in a comparative example in which, contrary to the cooling system 10 the refrigerant cooled by passing through the radiator 16 flows into the MG 102 prior to the PCU 106, the refrigerant whose temperature has increased by heat exchange with the MG 102 is supplied to the PCU 106. In contrast to this, according to the cooling system 10, the refrigerant that has passed through the radiator 16 is supplied to the PCU 106 prior to the MG 102. As a result, a low temperature refrigerant can be supplied to the PCU 106 as compared with the comparative example described above.

On the above basis, it is not reasonable for the following reasons to always supply the refrigerant of the same flow rate as the components of the PCU 106 to the components of the MG 102 having a relatively high heat resistance temperature. That is to say, the cooling performance of a cooled portion by a refrigerant is basically proportional to the product of the temperature difference between the refrigerant and the cooled portion, and the flow rate of the refrigerant. Because of this, if the refrigerant flow rate Qm flowing through the components of the MG 102 whose heat resistant temperature is relatively high is too high, the MG 102 will be excessively cooled, and the amount of heat that the refrigerant receives from the MG 102 will increase. This may lead to an increase in size of the radiator 16 in order to cool the refrigerant whose temperature has increased as a result of receiving the aforementioned amount of heat.

Accordingly, in order to cool the PCU 106 and the MG 102 using the same refrigerant while not exceeding the heat resistant temperature of the components of the PCU 106 that is lower than that of the components of the MG 102, it is desirable not only to supply the refrigerant that has passed through the radiator 16 to the PCU 106 prior to the MG 102, but also to appropriately control the refrigerant flow rate Qm on the MG 102 side using, as a reference, the refrigerant flow rate Qp on the PCU 106 side.

1-2-1. Flow Rate Limiting Mode

According to the flow control valve 20 described above, the ratio R of the refrigerant flow rate Qm to the refrigerant flow rate Qp can be changed between 0-100%. The control mode of the flow control valve 20 used in the present embodiment include a "flow rate limiting mode". This flow rate limiting mode adjusts the ratio R by controlling the flow control valve 20 such that the refrigerant flow rate Qm becomes less than the refrigerant flow rate Qp by selecting a ratio R of 0% or more and less than 100%. That is to say, according to the flow rate limiting mode, only a part (including zero) of the flow rate Qp of the refrigerant that has passed through the PCU 106 will be supplied to the MG 102.

According to the flow rate limiting mode described above, by reducing the temperature rise of the refrigerant due to excessive (or useless) cooling of the components of the MG 102 whose heat resistant temperature is relatively high, the temperature of the refrigerant in the refrigerant circulation circuit 12 can be kept low. As a result, it becomes possible to supply a low temperature refrigerant to the PCU 106 without relying on the increase in size of the radiator 16. In addition, the miniaturization of the radiator 16 leads to cost and weight reduction.

1-2-2. Specific Control Example of Flow Control Valve

Moreover, the amount of heat generated by the MG 102 (more specifically, the stator coil 110b) is not always the same. In more detail, this amount of heat generated basically becomes higher when the torque outputted from the MG 102 is higher (i.e., when the drive current of the MG 102 is greater). In other words, the refrigerant flow rate Qm required for the second cooled portion on the MG 102 side may change during the operation of the electrified vehicle for this kind of reason, for example. Therefore, it is desirable that the control of the flow control valve 20 be performed such that the refrigerant flow rate Qm is minimized as much as possible within the range allowed in terms of the heat resistant temperature of the components of the MG 102 while taking into consideration a change in the amount of heat generated by the MG 102 during the operation of the electrified vehicle. To be more specific, in order to keep low the refrigerant temperature in the refrigerant circulation circuit 12, it is desirable to minimize the refrigerant flow rate Qm. Therefore, in the present embodiment, in further view of this kind of issue, the control of the flow control valve 20 during the execution of the MG flow rate limiting mode is performed as follows.

Among the components of the MG 102, the permanent magnet 108c and the stator coil 110b can be mentioned as parts having a relative low heat resistant temperature. Therefore, the control device 22 adjusts the ratio R by controlling the flow control valve 20 such that the temperature T1 of the permanent magnet 108c does not exceed its control upper limit temperature TtrgU1 and approaches the control upper limit temperature TtrgU1 during the execution of the flow rate limiting mode. Also, the control device 22 adjusts the ratio R by controlling the flow control valve 20 such that the temperature T2 of the stator coil 110b does not exceed its control upper limit temperature TtrgU2 and approaches the control upper limit temperature TtrgU2 during the execution of the flow rate limiting mode.

Figure 2:
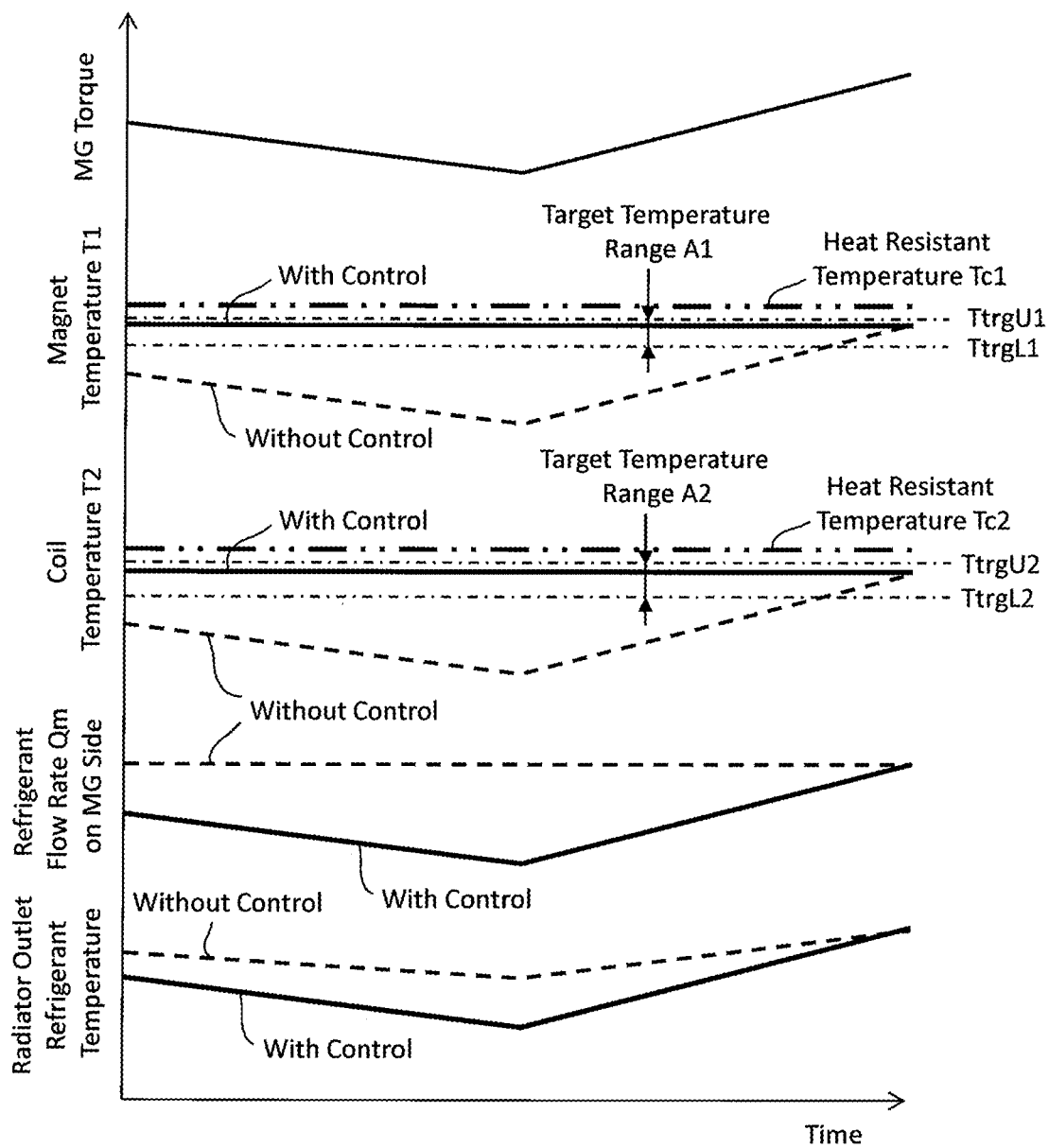
FIG. 2 is a time chart conceptually showing an example of operation of control of a flow control valve according to the first embodiment of the present disclosure.

FIG. 2 is a time chart conceptually showing an example of operation of the control of the flow control valve 20 according to the first embodiment. As shown in FIG. 2, the control upper limit temperature TtrgU1 of the permanent magnet 108c is lower than a heat resistant temperature Tel of the permanent magnet 108c. In more detail, the control upper limit temperature TtrgU1 is determined as a temperature value lower than the heat resistant temperature Tel by a predetermined margin in consideration of, for example, the heat capacity of the permanent magnets 108c. The reason why the heat capacity is taken into consideration is that the speed of temperature change of the permanent magnet 108c caused by the change of the refrigerant flow rate Qm by the flow control valve 20 differs depending on the heat capacity. Specifically, when the heat capacity increases, the speed of the temperature change slows down. The margin described above is set to a value depending on the magnitude of the heat capacity of the permanent magnet 108c such that the magnet temperature T1 does not exceed the heat resistant temperature Tel (criteria) during the control of the flow control valve 20.

The control upper limit temperature TtrgU2 of the stator coil 110b is lower than the heat resistant temperature Tc2 of the stator coil 110b. In more detail, based on the same idea as the control upper limit temperature TtrgU1 of the permanent magnets 108c, the control upper limit temperature TtrgU2 is determined as a temperature value lower than the heat resistant temperature Tc2 by a predetermined margin in consideration of, for example, the heat capacity of the stator coils 110b.

Moreover, FIG. 2 also shows a control lower limit temperature TtrgL1 of the permanent magnet 108c. The temperature range having the control upper limit temperature TtrgU1 as its upper limit and the control lower limit temperature TtrgL1 as its lower limit corresponds to a target temperature range A1 of the permanent magnets 108c. The control lower limit temperature TtrgL1 is determined as a lower limit temperature for preventing the permanent magnet 108c from being overcooled, based on, for example, the specifications of the cooling system 10 such as the size of the radiator 16. A control lower limit temperature TtrgL2 of the stator coil 110b is also determined based on the same concept. Furthermore, a target temperature range A2 of the stator coil 110b is specified by the control upper limit temperature TtrgU2 and the control lower limit temperature TtrgL2.

FIG. 2 shows an example in which the torque (MG torque) outputted from the MG 102 for driving the vehicle first gradually decreases, then starts to increase, and then gradually increases. Each of waveforms shown by broken lines in FIG. 2 is associated with an example without the control of the flow control valve 20 according to the present embodiment (i.e., an example in which the refrigerant flow rate Qm on the MG 102 side is controlled to be constant). On the other hand, each of waveforms shown by solid lines in the same figure corresponds to an example with the control of the flow control valve 20 according to the present embodiment. It should be noted that, in the example shown in FIG. 2, the discharge flow rate of the pump 14 is assumed to be constant.

Hereinafter, taking the magnet temperature T1 as an example, the example with the control of the present embodiment will be described while comparing it with the example without the control. However, the operation of the control for the coil temperature T2 can be explained in the same manner as the operation of the control for the magnet temperature T1.

First, in the example (broken lines) without the control, even if the amount of heat generated by the MG 102 decreases due to a decrease in the MG torque, the refrigerant flow rate Qm remains constant. Because of this, the magnet temperature T1 also decreases in association with a decrease in the MG torque. Thereafter, in association with an increase in the MG torque, the magnet temperature T1 also increases.

On the other hand, in the example (solid lines) with the control according to the present embodiment, the refrigerant flow rate Qm is adjusted by the control of the ratio R such that the magnet temperature T1 changes within the target temperature range A1. In the solid line in FIG. 2, the magnet temperature T1 is schematically represented as constant, but more specifically, it fluctuates as follows. That is to say, with respect to a change in the magnet temperature T1 associated with a change in the MG torque, the refrigerant flow rate Qm is adjusted such that the magnet temperature T1 falls within the target temperature range A1. For example, when the magnet temperature T1 decreases in association with a decrease in the MG torque, the ratio R is lowered to reduce the refrigerant flow rate Qm. On the other hand, when the magnet temperature T1 increases in association with an increase in the MG torque, the ratio R is increased to increase the refrigerant flow rate Qm. As a result of this kind of adjustment of the refrigerant flow rate Qm, the magnet temperature T1 fluctuates within the target temperature range A1. Also, the target temperature range A1 is set as a temperature range near the control upper limit temperature TtrgU1 with the control upper limit temperature TtrgU1 as its upper limit. Therefore, according to the present control, the magnet temperature T1 is controlled so as to approach the control upper limit temperature TtrgU1 without exceeding the control upper limit temperature TtrgU1.

As described above, the target temperature range A1 is specified by the control upper limit temperature TtrgU1, which is lower than the heat resistant temperature Tel by the margin described above, and the control lower limit temperature TtrgL1, which is determined so as not to overcool the permanent magnets 108c. Moreover, as described with reference to FIG. 2, according to the control of the flow control valve 20 according to the present embodiment, the refrigerant flow rate Qm is adjusted so as to have a value that is limited to the extent that the magnet temperature T1 can be kept in the target temperature range A1. That is to say, the refrigerant flow rate Qm is controlled so as to be the minimum necessary flow rate. As a result, it is possible to reduce a temperature increase of the refrigerant caused by excessive (wasteful) cooling of the permanent magnet 108c during the actual running of the vehicle in which the temperature (heat generation amount) of the MG 102 changes in accordance with the MG torque. Therefore, as shown in FIG. 2, the refrigerant temperature at the outlet of the radiator 16 (i.e., the temperature of the refrigerant supplied to the PCU 106) can be kept low as compared with the example without the control.

1-2-3. Example of Processing by Control Device

Figure 3:
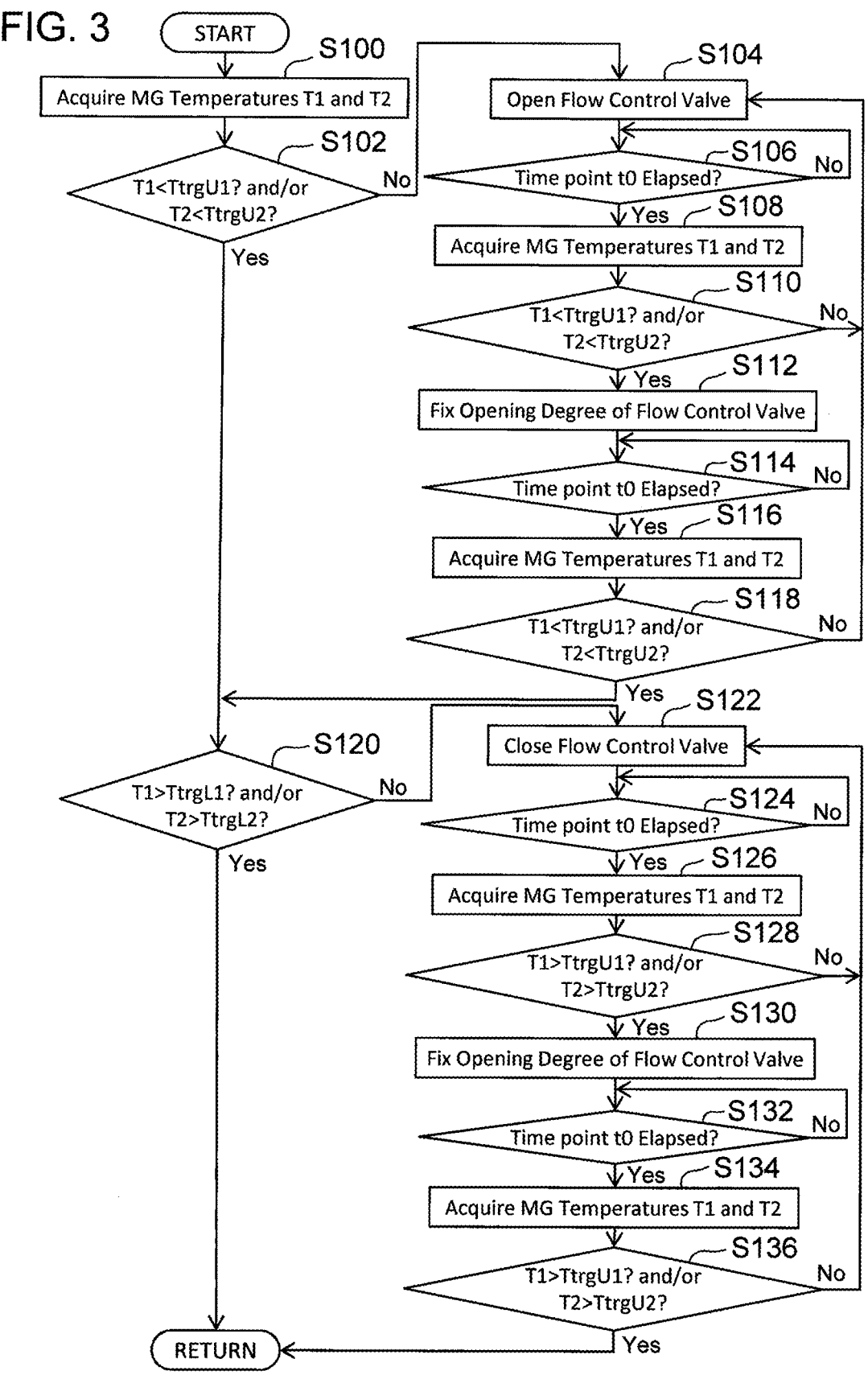
FIG. 3 is a flowchart showing a routine of processing relating to the control of the flow control valve according to the first embodiment of the present disclosure.

The above-described control of the flow control valve 20 in consideration of the temperatures T1 and T2 of the permanent magnet 108c and the stator coil 110b is achieved by the control device 22 executing, for example, the processing of a routine shown in FIG. 3.

It should be noted that, in the present embodiment, the ratio R not only takes a value of 0% or more and less than 100% selected during the execution of the flow rate limiting mode, but may also take a value of 100% as needed. In addition, it is assumed that the following processing of the routine shown in FIG. 3 is executed not only during the execution of the flow rate limiting mode but also during the execution of a "full flow rate mode" in which the ratio R of 100% is selected. On the other hand, instead of this kind of example, the processing of the routine shown in FIG. 3 may be executed only during the execution of the "flow rate limiting mode".

FIG. 3 is a flowchart showing a routine of the processing relating to the control of the flow control valve 20 according to the first embodiment. The present routine is repeatedly executed during the operation of the electrified vehicle system in which the cooling system 10 is mounted. To be more specific, as a premise, the operation of the pump 14 (i.e., the circulation of the refrigerant) is started when the energization of the MG 102 is started after the start-up of the electrified vehicle system. This is because the components of the PCU 106 include components having a very small heat capacity (e.g., power semiconductor elements), and the cooling of this kind of components is required to be started promptly. Furthermore, at this start of the operation of the pump 14, the flow control valve 20 is assumed to be in the fully closed state (i.e., the state in which the ratio R is 0%). This is to prevent, at the initial stage of the start-up, unnecessary supply of the refrigerant to the components of the MG 102, which does not need to start cooling as quickly as compared with the components of the PCU 106, which requires quick start of the cooling. It should be noted that the discharge flow rate of the pump 14 itself is controlled, for example, based on the cooling requests of the components of the PCU 106.

According to the routine shown in FIG. 3, first, in step S100 the control device 22 acquires the MG temperatures (more specifically, the temperature T1 of the permanent magnet 108c and the temperature T2 of the stator coil 110b). These MG temperatures T1 and T2 can be acquired, for example, by the above described method using the temperature information from the temperature sensor 24. After the processing of step S100, the control device 22 proceeds to step S102.

In step S102, the control device 22 determines whether or not at least one of the MG temperatures T1 and T2 is lower than the respective control upper limit temperatures TtrgU1 and TtrgU2. As a result, if this determination result is negative, that is, if at least one of the MG temperatures T1 and T2 reaches the respective control upper limit temperatures TtrgU1 and TtrgU2, the control device 22 proceeds to step S104. If, on the other hand, the determination result is positive, the control device 22 proceeds to step S120.

In step S104, the control device 22 opens the flow control valve 20. In detail, the opening degree of the flow control valve 20 is increased by a predetermined amount so as to increase the ratio R. Then, the control device 22 proceeds to step S106 and determines whether or not a predetermined time t0 has elapsed. As described above, the heat capacity of the components of the MG 102 is large. Because of this, the changes of the MG temperatures T1 and T2 do not need to be monitored at short time intervals on the order of about 0.1 second, and the predetermined time t0 of, for example, about 1 second or 5 seconds is sufficient.

If the predetermined time t0 has elapsed after the opening degree of the flow control valve 20 is increased in step S104, the control device 22 proceeds to step S108, and acquires the MG temperatures T1 and T2 again. Then, the control device 22 proceeds to step S110, and performs the same determination as step S102 using the latest MG temperatures T1 and T2. As a result, if this determination result is negative, it can be judged that at least one of the MG temperatures T1 and T2 continues to reach the control upper limit temperatures TtrgU1 and TtrgU2 even though the opening degree of the flow control valve 20 is increased. Thus, the control device 22 proceeds to step S104 and further increases the opening degree of the flow control valve 20 by the predetermined amount.

If, on the other hand, the determination result of step S100 is positive, that is, if it can be judged that at least one of the MG temperatures T1 and T2 has stopped rising, the control device 22 proceeds to step S112 to fix the opening degree of the flow control valve 20 at the current opening degree. Thereafter, after the elapse of the predetermined time t0, the control device 22 acquires the MG temperatures T1 and T2 again (steps S114 and S116). Then, the control device 22 proceeds to step S118 and makes the same determination as in step S102. This is to reliably determine that at least one of the MG temperatures T1 and T2 has stopped rising as a result of fixing the opening degree of the flow control valve 20 by the processing of step S112.

If the determination result of step S118 is negative, that is, if it can be determined that at least one of the MG temperatures T1 and T2 has started to rise again, the control device 22 repeatedly executes the processing of step S104 and subsequent steps. If, on the other hand, this determination result is positive, the control device 22 proceeds to step S120.

In step S120, the control device 22 determines whether or not at least one of the MG temperatures T1 and T2 is higher than the respective control lower limit temperatures TtrgL1 and TtrgL2. As a result, if this determination result is positive, the control device 22 ends the current processing cycle.

If, on the other hand, the determination result is negative, that is, if at least one of the MG temperatures T1 and T2 reaches the respective control lower limit temperatures TtrgL1 and TtrgL2, the control device 22 executes the processing of steps S122-S136. The processing of steps S122-S136 is the same as that of steps S104-S118 except that the increase or decrease in the opening degree of the flow control valve 20 is opposite, and therefore, the explanation thereof will be simplified as follows.

That is to say, in step S122, the control device 22 closes the flow control valve 20 (more specifically, decreases the opening degree of the flow control valve 20 by the predetermined amount). Thereafter, if at least one of the MG temperatures T1 and T2 acquired after the elapse of the predetermined time t0 still reaches the control lower limit temperatures TtrgL1 and TtrgL2 (steps S124-S128), the control device 22 further decreases the opening degree of the flow control valve 20 by the predetermined amount (step S122). If, on the other hand, it can be judged in step S128 that at least one of the MG temperatures T1 and T2 has stopped decreasing, the control device 22 fixes the opening degree of the flow control valve 20 at the current opening degree (step S130). Thereafter, if it can be judged that at least one of the MG temperatures T1 and T2 has started to rise again after the elapse of the predetermined time t0 (steps S132-S136), the control device 22 repeatedly executes the processing of step S122 and subsequent steps. If, on the other hand, it can be reliably determined in step S136 that at least one of the MG temperatures T1 and T2 has stopped decreasing as a result of fixing the opening degree, the control device 22 ends the current processing cycle.

Figure 4:
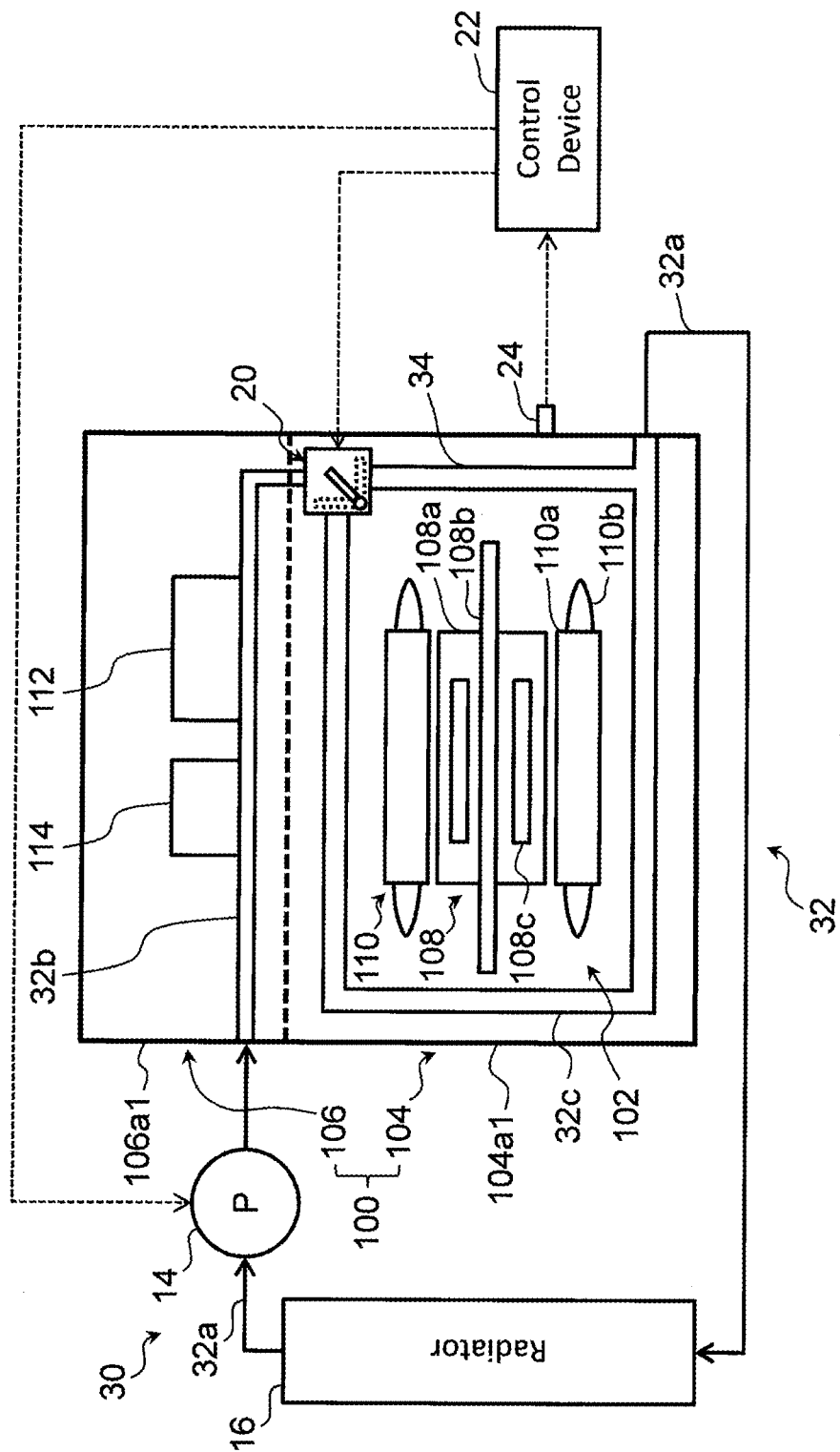
FIG. 4 is a schematic diagram showing another example of a configuration of a refrigerant circulation circuit and bypass flow path according to the first embodiment of the present disclosure.

1-3. Another Example of Configuration of Refrigerant Circulation Circuit and Bypass Flow Path FIG. 4 is a schematic diagram showing another example of the configuration of the refrigerant circulation circuit and bypass flow path according to the first embodiment. A cooling system 30 shown in FIG. 4 is different from the cooling system 10 shown in FIG. 1 in that the cooling system 30 is provided with a refrigerant circulation circuit 32 and a bypass flow path 34 instead of the refrigerant circulation circuit 12 and the bypass flow path 18.

Specifically, the refrigerant circulation circuit 32 is configured by a refrigerant pipe 32a, an internal pipe 32b and an internal flow path 32c. The refrigerant pipe 32a is disposed outside the T/A 104 and the PCU 106. Each of the internal pipe 32b and the internal flow path 32c is connected to the refrigerant pipe 32a. The internal pipe 32b is disposed in a PCU case 106a1. The outlet of the internal pipe 12b shown in FIG. 1 is connected to the refrigerant pipe 12a located outside the PCU case 106a, whereas the outlet of the internal pipe 32b shown in FIG. 3 is connected to the internal flow path 32c formed in a T/A case 104a1 itself. Moreover, contrary to the example shown in FIG. 1, all portions of the internal flow path 32c from the inlet to the outlet are formed in the T/A case 104a1 itself. Therefore, in the example shown in FIG. 4, the flow control valve 20 is built in the T/A case 104a1. Furthermore, the bypass flow path 34 is also formed in the T/A case 104a1 itself.

As in the configuration example shown in FIG. 4 described above, the portion of the refrigerant circulation circuit 32 connecting between the first cooled portion of the PCU 106 and the second cooled portion of the MG 102, and the flow control valve 20 may be built in the PCU 106 and the T/A 104 (i.e., rotating electrical machine unit).

2. SECOND EMBODIMENT

Figure 5:
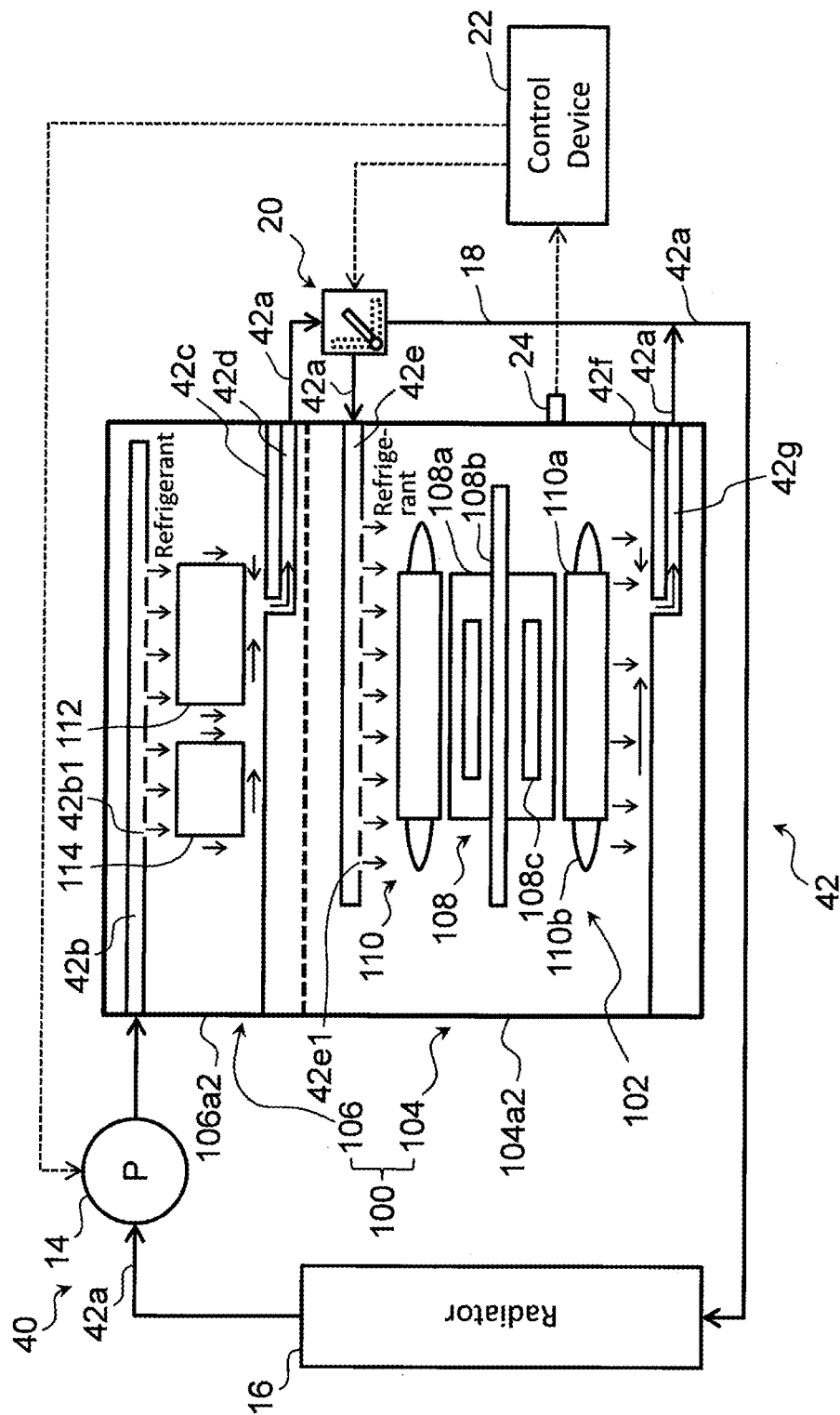
FIG. 5 is a schematic diagram showing an example of a configuration of a cooling system according to a second embodiment of the present disclosure.

FIG. 5 is a schematic diagram showing an example of the configuration of a cooling system 40 according to a second embodiment. The cooling system 40 shown in FIG. 5 is different from the cooling system 10 shown in FIG. 1 in that the cooling system 40 is provided with a refrigerant circulation circuit 42 instead of the refrigerant circulation circuit 12. In this cooling system 40, instead of the coolant described above, an oil having an insulating property is used as the refrigerant flowing through the refrigerant circulation circuit 42.

The refrigerant circulation circuit 42 is configured by refrigerant pipes 42a and 42b, an oil pan 42c, an internal flow path 42d, a refrigerant pipe 42e, an oil pan 42f and an internal flow path 42g. The refrigerant pipe 42a is disposed outside the T/A 104 and the PCU 106. The upper direction of the drawing in FIG. 5 corresponds to the vertically upward direction. The refrigerant pipe 42b is disposed so as to extend in the horizontal direction in an upper portion of a PCU case 106a2. A plurality of holes 42b1 are formed on the surface of the refrigerant pipe 42b. The refrigerant flowing through the refrigerant pipe 42b is discharged from those holes 42b1 toward the first cooled portion (i.e., the power semiconductor module 112 and the capacitor 114). That is to say, the refrigerant (i.e., the oil having an insulating property) is applied directly to the first cooled portion. As a result, the first cooled portion is cooled by the refrigerant.

The oil pan 42c is disposed in a lower portion of the PCU case 106a2, and temporarily stores the refrigerant (oil) dropped from the first cooled portion. The internal flow path 42d is formed in the PCU case 106a2 itself below the oil pan 42c, and discharges the refrigerant accumulated in the oil pan 42c toward the refrigerant pipe 42a.

The refrigerant pipe 42e is formed in a T/A case 104a2 itself so as to extend in the horizontal direction in an upper portion of the T/A case 104a2. The refrigerant discharged from the PCU 106 is distributed to the bypass flow path 18 or the refrigerant pipe 42e by the flow control valve 20. A plurality of holes 42e1 are formed on the surface of the refrigerant pipe 42e. The refrigerant flowing through the refrigerant pipe 42e is discharged toward those holes 42e1 to the second cooled portion (i.e., the rotor 108 and the stator 110). That is to say, the refrigerant (i.e., the oil having an insulating property) is applied directly to the second cooled portion. As a result, the second cooled portion is cooled by the refrigerant.

The oil pan 42f is disposed in the lower portion of the T/A case 104a2, and temporarily stores the refrigerant (oil) dropped from the second cooled portion. The internal flow path 42g is formed in the T/A case 104a2 itself below the oil pan 42f, and discharges the refrigerant accumulated in the oil pan 42f toward the refrigerant pipe 42a.

It should be noted that, even in the cooling system 40 using oil having an insulating property as a refrigerant, the flow control valve 20, and the refrigerant pipes and internal flow paths that are located around the flow control valve 20 may be disposed in the PCU 106 and the T/A 104, similarly to the configuration example shown in FIG. 4 described above. Furthermore, by using the refrigerant (oil) flowing from the refrigerant pipe 42e toward the internal flow path 42g, the cooling and lubrication of the gears in the T/A case 104a2 may also be performed.

Even by the cooling system 40 having the configuration described above, it is possible to adjust the ratio R by adjusting the opening degree of the flow control valve 20. Similarly to the cooling system 10, the cooling system 40 includes the above described flow rate limiting mode as the control mode of the flow control valve 20. Also, the control of the flow control valve 20 similar to that of the first embodiment described above may be executed for the cooling system 40.

3. OTHER EMBODIMENTS

In the first and second embodiments described above, the cooling systems including the flow control valve 20 that can adjust the ratio R within the range of 0% or more and 100% or less (i.e., the cooling systems including the full flow rate mode together with the flow rate limiting mode) 10, 30 and 40 have been exemplified. However, instead of these examples, the "cooling system" according to the present disclosure may be configured to select or achieve only the flow rate limiting mode. That is to say, the cooling system may be configured not to have a function of causing all of the flow rate of the refrigerant that has passed through the first cooled portion on the power control unit side (first refrigerant flow rate) to flow through the second cooled portion on the rotating electrical machine side, and to cause a part of the first refrigerant flow rate to flow through the second cooled portion.

Furthermore, according to the control of the flow control valve 20 described in the first embodiment, both the adjustment of the ratio R based on the temperature T1 of the permanent magnet 108c and the adjustment of the ratio R based on the temperature T2 of the stator coil 110b are executed. In another example of the control of the flow control valve according to the present disclosure, only one of these adjustments may be performed during the execution of the flow rate limiting mode.

The examples described in each of the above-described embodiments and the other modification examples may be combined in other ways than those explicitly described above as required and may be modified in various ways without departing from the scope of the present disclosure.

What is claimed is:

1. A cooling system for a powertrain,
the powertrain including:
a rotating electrical machine unit including a rotating electrical machine; and
a power control unit configured to drive the rotating electrical machine,
the cooling system comprising:
a radiator configured to cool a refrigerant;
a refrigerant circulation circuit configured to supply the refrigerant flowing out from the radiator to a second cooled portion being a cooled portion of the rotating electrical machine, via a first cooled portion being a cooled portion of the power control unit;
a bypass flow path connected to the refrigerant circulation circuit so as to bypass the second cooled portion;
a flow control valve configured to adjust a ratio of a second refrigerant flow rate being a flow rate of the refrigerant flowing through the second cooled portion to a first refrigerant flow rate being a flow rate of the refrigerant flowing through the first cooled portion; and
a control device configured to control the flow control valve, wherein
at least one control mode of the flow control valve performed by the control device includes a flow rate limiting mode in which the flow control valve is controlled to adjust the ratio such that the second refrigerant flow rate becomes less than the first refrigerant flow rate.

2. The cooling system according to claim 1, wherein
the rotating electrical machine includes a permanent magnet, and
the control device is configured to control the flow control valve to adjust the ratio such that, during the flow rate limiting mode, a temperature of the permanent magnet does not exceed a control upper limit temperature of the permanent magnet that is lower than a heat resistant temperature of the permanent magnet, and the temperature of the permanent magnet approaches the control upper limit temperature of the permanent temperature.

3. The cooling system according to claim 1, wherein
the rotating electrical machine includes a coil, and
the control device is configured to control the flow control valve to adjust the ratio such that, during the flow rate limiting mode, a temperature of the coil does not exceed a control upper limit temperature of the coil that is lower than heat resistant temperature of the coil, and the temperature of the coil approaches the control upper limit temperature of the coil.

* * * * *